United States Patent [19]
Song et al.

[11] Patent Number: 5,804,612
[45] Date of Patent: Sep. 8, 1998

[54] TRANSPARENT ANTI-FOG COATING

[75] Inventors: Jian Cheng Song; Sen Yang, both of Warwick, R.I.; Kang Sun, North Attleboro, Mass.

[73] Assignee: Arkwright, Incorporated, Fiskeville, R.I.

[21] Appl. No.: 641,550

[22] Filed: May 1, 1996

Related U.S. Application Data

[60] Provisional application No. 60/002,248 Jun. 8, 1995.

[51] Int. Cl.$^6$ ..................................................... C08K 3/18
[52] U.S. Cl. ........................... 523/169; 428/438; 428/442
[58] Field of Search ............................. 523/169; 428/438, 428/442

[56] References Cited

U.S. PATENT DOCUMENTS

| | | | |
|---|---|---|---|
| 3,865,619 | 2/1975 | Pennewiss et al. | 117/138.8 |
| 3,933,407 | 1/1976 | Tu et al. | 350/61 |
| 4,127,682 | 11/1978 | Laurin | 427/164 |
| 4,401,498 | 8/1983 | Jahn | 524/437 |
| 4,410,652 | 10/1983 | Robinson | 524/598 |
| 4,467,073 | 8/1984 | Creasy | 525/127 |
| 4,478,909 | 10/1984 | Taniguchi et al. | 428/331 |
| 4,609,688 | 9/1986 | Rädisch et al. | 523/169 |
| 4,664,713 | 5/1987 | Almond | 523/130 |
| 4,829,100 | 5/1989 | Murphey | 523/130 |
| 5,075,133 | 12/1991 | Hosono et al. | 427/162 |
| 5,116,442 | 5/1992 | Daude et al. | 156/99 |
| 5,244,935 | 9/1993 | Oshibe et al. | 522/151 |
| 5,246,073 | 9/1993 | Sandiford | 523/130 |
| 5,420,195 | 5/1995 | Mayer | 525/370 |
| 5,478,872 | 12/1995 | Yamasoe | 524/43 |
| 5,527,854 | 6/1996 | Matsukawa | 524/608 |
| 5,563,197 | 10/1996 | Donatelli | 524/436 |

FOREIGN PATENT DOCUMENTS

| | | |
|---|---|---|
| 0123927 | 11/1984 | European Pat. Off. . |
| 7243988 | 7/1973 | France . |
| 57-119974 | 7/1982 | Japan . |
| 63-150369 | 6/1988 | Japan . |
| 5-0012535 | 1/1993 | Japan . |
| 1422149 | 1/1976 | United Kingdom . |

*Primary Examiner*—Paul R. Michl
*Attorney, Agent, or Firm*—Birch, Stewart, Kolasch & Birch, LLP

[57] ABSTRACT

The present invention is directed to an anti-fogging coating that can be used for anti-fog applications. The coating is transparent, and comprises a hydroxyl group containing polymer, an aluminum containing crosslinker, and a surface active agent containing hydroxyl and/or siloxane groups. Additionally, the coatings possess a $T_{fog}$ of greater than about 30 minutes and a haze of less than about 5%, and can advantageously be used to provide to glass or plastic substrates an anti-fogging surface.

18 Claims, No Drawings

TRANSPARENT ANTI-FOG COATING

This application claims priority on provisional application Ser. No.60/002,248 filed on Jun. 8, 1995.

FIELD OF THE INVENTION

This invention relates to a coating composition and more particularly to a coating composition that can be used for anti-fog applications.

BACKGROUND OF THE INVENTION

For many years, there has been a need for a fog free (anti-fogging) coating that can absorb and release moisture and provide an anti-fog property under a variety of environmental conditions. Glass or plastic materials used for windows, mirrors, lenses, goggles, and facial masks or shields become foggy when they are exposed to high humidity and temperature, or used at interfacial boundaries with a large difference in temperature or humidity. Fog is caused by the condensation of moisture on the surface. To reduce or eliminate this problem, a coating that absorbs and releases moisture simultaneously is needed. A number of designs have been proposed for this application. For example, U.S. Pat. No. 5,244,935 describes a UV curable amide polymer, U.S. Pat. No. 5,116,442 describes a polyethylene oxide system, U.S. Pat. No. 4,609,688 describes a crosslinked polyurethane system, U.S. Pat. No. 5,075,133 describes a crosslinked poly(vinyl alcohol) coating, U.S. Pat. No. 4,478,909 describes a poly(vinyl alcohol)-silica system, U.S. Pat. No. 4,127,682 describes a crosslinked poly(vinyl alcohol) coating, U.S. Pat. No. 4,467,073 describes a poly(vinyl pyrrolidone) based system, U.S. Pat. No. 3,933,407 describes an acrylic siloxane system, and U.S. Pat. No. 3,865,619 describes a crosslinked carboxylic acid-acrylic acid ester system. Although the above noted designs have addressed some of the problems in the field, none provides a total solution to the anti-fog application. For example, most of the designs have low moisture absorptivity, long moisture release time, and poor water and solvent resistance. Some of the designs also have inefficient fabrication processes, e.g., a long coat curing time. Moreover, a majority of anti-fog materials used in the markets today cannot be used repeatedly due to the poor water and low abrasion resistance possessed thereby. To be useful in most commercial applications, the anti-fog coating should possess high clarity, be able to absorb and release moisture simultaneously, possess abrasion resistance, and be able to resist water and conventional organic solvents, such as alcohols, alkylbenzenes (e.g., toluene), glycol ethers (e.g., propylene glycol monomethyl ether), and alkyl ketones (e.g., methyl ethyl ketone).

SUMMARY OF THE INVENTION

We provide for a transparent anti-fog (fog-free) coating composition that can be used to provide a transparent anti-fog coating to a base substrate, wherein the coating so provided possesses high clarity, fast moisture absorption and release properties, abrasion resistance, and water and conventional organic solvent resistance.

The anti-fog coating compositions can be used in a wide range of environmental conditions. Because of their water resistance, coatings prepared with the inventive compositions can be used in both temporary and semi-permanent anti-fog applications.

The anti-fog coating compositions of the present invention comprise a polymer containing hydroxyl groups, an aluminum containing crosslinker and a surface active agent containing hydroxyl and/or siloxane groups. The present invention also provides for glass and plastic articles having an anti-fogging surface, wherein such articles comprise a glass or plastic substrate having at least a portion of an exterior surface thereof coated with an anti-fog coating composition of the present invention. Exemplary of such articles are windows, mirrors, lenses, goggles, facial masks and shields, and glass and plastic sheets more generally. Preferably, the base substrate to which the anti-fog coating composition is applied is transparent.

DETAILED DESCRIPTION OF THE INVENTION

In the present invention, there is provided an advantageous anti-fog coating composition. The anti-fog coating composition of the present invention comprises one or more polymeric materials containing hydroxyl groups, an aluminum containing crosslinker, and one or more surface active agents containing hydroxyl and/or siloxane groups.

The hydroxyl group containing polymeric material provides moisture absorptivity to the coating. Preferably, the hydroxyl group containing polymeric material is present in the coating composition in an amount of about 10 to about 80 wt %, based on the total weight of solids in the coating composition. More preferably, the hydroxyl group containing polymeric material is present in the coating composition in an amount of about 20 to about 60 wt %, based on the total weight of solids in the coating. Exemplary of such hydroxyl group containing polymeric materials are poly(vinyl alcohol), poly(vinyl acetate), cellulose ethers, mixtures thereof, and the like.

The aluminum containing crosslinker reacts with hydroxyl groups of the "hydroxyl group containing polymeric material" to thereby form a polymer network. The crosslinking reaction imparts water and organic solvent resistance to the inventive anti-fog coatings. Preferably, the concentration of the aluminum containing crosslinker ranges from about 20 to about 90 wt %, based on the total weight of solids in the inventive coatings. More preferably, the concentration of the crosslinker ranges from about 40 to about 80 wt %, based on the total weight of solids in the coatings. In order to have desired clarity, the average dispersed particle size of these crosslinkers should be less than about 1 micrometer.

The present invention preferably employs aluminum-containing crosslinkers which contain therein a relatively high concentration of hydroxyl groups. The hydroxyl groups associated with such aluminum-containing crosslinkers not only provide reactive sites for polymer network formation, but also improve the moisture absorption and release properties of the inventive coatings. In addition, the use of these types of aluminum-containing crosslinkers provide improved abrasion resistance to the inventive coatings. This improved abrasion resistance is believed to result from a reaction which takes place between the hydroxyl groups of the aluminum-containing crosslinkers and hydroxyl groups of the hydroxyl group containing polymers. Typical examples of such aluminum-containing crosslinkers are aluminum oxide, aluminum salts, alumina hydrate, aluminum hydroxide, pseudo-boehmite, boehmite alumina, and the like.

The surface active agents present in the inventive anti-fog coating compositions contain hydroxyl and/or siloxane groups. Surface active agents provide both moisture absorptivity and improved wettability to the coating compositions.

Typical examples of surface active agents which are useful in the present invention include nonoxynol, silicone glycol, poly(oxy-1, 2-ethane-diyl)-alpha(nonphenyl)omega-hydroxy, ethoxylated acetylenic diol, glyceryl monooleate, polyether modified dimethylpolysiloxane, mixtures thereof, and the like. Preferably, the surface active agent is present in the coating composition in an amount of about 0.05 to 10 wt %, based on the total weight of solids in the coating composition. More preferably, the surface active agent is present in the coating composition in an amount of about 0.1 to 5 wt %, based on the total weight of solids in the coating composition.

The coatings of the present invention are prepared by mixing together the ingredients of the coating in a coating composition, treating (e.g., heating) the coating composition to form a crosslinked polymeric network, and then forming an anti-fog coating layer with the coating composition. Suitable temperatures and times for forming the crosslinked polymeric network in the coating composition preferably range from about 100° C. to about 150° C., and from about 2 to about 15 minutes, respectively. These temperatures and times are not limiting to the present invention, however, since those of ordinary skill in the art will recognize that the temperatures and times utilized will vary according to the actual physical characteristics of the formed coating (e.g., coating layer thickness, etc.). Even so, as a general rule, the higher the treating temperature utilized—the quicker the crosslinked polymeric network forms in the coating composition.

The coatings of the present invention are typically used to provide anti-fog properties to a base substrate's surface, wherein the base substrate comprises a plastic or glass material. Suitable plastic materials for the use in the base substrate include polyester, cellulose esters, polycarbonate, polystyrene, poly(vinyl acetate), polyolefins, and the like. All glass materials are suitable for use in the base substrate.

The thickness of the base substrate is not particularly restricted, and usually depends entirely upon the application. The base substrate may be pretreated to enhance adhesion of the anti-fog coating thereto.

Any number of coating methods may be employed to coat one of the present inventive anti-fog coatings onto a surface of a desired base substrate. For example, roller coating, wire-bar coating, dip coating, extrusion coating, air knife coating, curtain coating, slide coating, blade coating, doctor coating, or gravure coating, may be used and are well known in the art.

The coat weight of the anti-fog coating is not particularly restricted, but should generally be in the range from about 1 $g/m^2$ to about 10 $g/m^2$, preferably from about 2 $g/m^2$ to about 6 $g/m^2$.

The anti-fog property of the inventive coatings is expressed by the value $T_{fog}$, which is the time it takes to form a fog on a surface of the present inventors' coating. The anti-fog property is evaluated by exposing the coating to steam from boiling water at a 20 centimeter distance from the water's surface in an environment of 50% RH (relative humidity) and 22° C. The present inventors' coating compositions provide anti-fog coatings having a $T_{fog}$ of greater than about 30 minutes, i.e., no fog is formed on a surface of said coating within about 30 minutes under the testing conditions described.

Coating clarity is expressed by haze value and is measured on a BYK GARDNER XL-211 Hazegard System. The present inventor' coating compositions provide anti-fogging coatings that possesses a haze value equal to or less than about 5%.

The water resistance of the inventive coatings is expressed by a value termed "Water Resistance Index (WRI)". WRI is measured by rubbing a coating made from one of the present inventor' coating compositions with a wet cotton pad (e.g., MULTILITH Pad) saturated with water. A unit of WRI represents one rubbing across the coating. The present inventor' coating compositions provide anti-fog coatings having a WRI of greater than 8, i.e., the coatings are not damaged by eight rubbings.

The organic solvent resistance of the coatings is expressed by a value termed "Solvent Resistance Index (SRI)" and is measured by rubbing a coating made from one of the present inventor' coating compositions with a wet cotton pad saturated with solvent. Typical solvents used for the evaluation of SRI include alcohols, methyl ethyl ketone, propylene glycol monomethyl ether, and toluene. A unit of SRI represents one rubbing across the coating. The present inventor' coating compositions provide anti-fog coatings which possess an SRI of greater than 8, i.e., the coatings are not damaged by eight rubbings.

In practice, various additives may also be employed in the inventive coating compositions and coatings. For example, such additives can include antistatic agents, particulates which control the friction or surface contact areas, defoamers, and buffers to control pH of the coating compositions, among other properties, of the coating compositions and the coated substrates encompassed hereby. Other additives may also be used, if desired.

The following examples are given merely as illustrative of the present discovery and are not to be considered as limiting thereto.

EXAMPLE 1

A coating composition was prepared according to the following formulation:

| | |
|---|---|
| Poly(vinyl alcohol)[1] | 2.65 parts |
| Boehmite alumina[2] | 5.28 parts |
| Polyether modified dimethylpolysiloxane[3] | 0.08 parts |
| Water | 92.00 parts |

[1]Air Products and Chemicals Company.
[2]Vista Chemical Company
[3]BYK Chemie USA The anti-fog coating was applied to a polyester film (ICI) using a No. 24 Meyer rod. The coating was dried in an oven at about 150° C. for about 2 minutes.

EXAMPLE 2

A coating composition was prepared according to the following formulation:

| | |
|---|---|
| Hydroxyethyl cellulose | 0.85 parts |
| Boehmite alumina | 1.70 parts |
| Polyether modified dimethylpolysiloxane | 0.025 parts |
| Silicone glycol[1] | 0.025 parts |
| Water | 97.35 parts |

[1]PPG Industries

The anti-fog coating was applied to a polyester film (ICI) using a No. 24 Meyer rod. The coating was dried in an oven at about 150° C. for about 2 minutes.

The present inventive discovery is not to be construed as being limited by the above given examples, or the above detailed disclosure relating thereto, since those of ordinary skill in the art will readily realize that various changes and modifications can be made in the materials and procedures set forth herein, without departing from the spirit or scope of the present inventive discovery. Each of the publications and patent documents which have been referred to herein, are incorporated herein by reference in their entirety.

What is claimed:

1. An anti-fog coating comprising:
   a hydroxyl group containing polymer selected from the group consisting of poly(vinyl alcohol), poly(vinyl acetate), cellulose ethers and mixtures thereof;
   an aluminum containing crosslinker; and
   a surface active agent selected from the group consisting of nonoxynol, silicone glycol, poly(oxy- 1,2- ethanediyl)-alpha(nonphenyl)omega-hydroxy, ethoxylated acetylenic diol, glyceryl monooleate, polyether modified dimethylpolysiloxane and mixtures thereof.

2. The coating according to claim 1, wherein said hydroxyl group containing polymer is present in said coating in an amount of about 10 to about 80 wt %, based on the total weight of solids in said coating.

3. The coating according to claim 1, wherein said aluminum containing crosslinker is present in said coating in an amount of about 20 to about 90 wt %, based on the total weight of solids in said coating.

4. The coating according to claim 1, wherein said hydroxyl group containing polymer is a homopolymer.

5. The coating according to claim 1, wherein said hydroxyl group containing polymer is a copolymer.

6. The coating according to claim 1, wherein said aluminum containing crosslinker is selected from the group consisting of aluminum oxide, aluminum hydroxide, boehmite alumina, alumina hydrate, pseudo-boehmite, an aluminum salt and mixtures thereof.

7. An anti-fog coating, comprising:
   about 10 to about 80 wt %, based on the total weight of solids in said coating, of a hydroxyl group containing polymer selected from the group consisting of poly(vinyl alcohol), poly(vinyl acetate), cellulose ethers and mixtures thereof;
   about 20 to about 90 wt %, based on the total weight of solids in said coating, of an aluminum containing crosslinker having an average dispersed particle size of less than about 1 micrometer, and selected from the group consisting of aluminum oxide, aluminum hydroxide, boehmite alumina, alumina hydrate, an aluminum salt and mixtures thereof; and
   a surface active agent selected from the group consisting of nonoxynol, silicone glycol, poly(oxy-1,2-ethanediyl)-alpha(nonphenyl)omega-hydroxy, ethoxylated acetylenic diol, glyceryl monooleate, polyether modified dimethylpolysiloxane and mixtures thereof.

8. The coating according to claim 7, wherein:
   said hydroxyl group containing polymer is present in said coating in an amount of about 20 to about 60 wt %, based on the total weight of solids in said coating, and
   said aluminum containing crosslinker is present in said coating in an amount of about 40 to about 80 wt %, based on the total weight of solids in said coating.

9. The coating according to claim 7, wherein said hydroxyl group containing polymer is a homopolymer.

10. The coating according to claim 7, wherein said hydroxyl group containing polymer is a copolymer.

11. A glass or plastic article having an anti-fogging surface, comprising:
    (a) a glass or plastic material base substrate; and
    (b) on at least a portion of a surface of said base substrate, an anti-fog coating containing:
    a hydroxyl group containing polymer selected from the group consisting of poly(vinyl alcohol), poly(vinyl acetate), cellulose ethers and mixtures thereof,
    an aluminum containing crosslinker, and
    a surface active agent selected from the group consisting of nonoxynol, silicone glycol, poly(oxy-1,2-ethanediyl)-alpha(nonphenyl)omega-hydroxy, ethoxylated acetylenic diol, glyceryl monooleate, polyether modified dimethylpolysiloxane and mixtures thereof;
    provided that said coating possesses a coat weight of from about 1 g/m$^2$ to about 10 g/m$^2$, a haze of about 5% or less and a $T_{fog}$ of greater than about 30 minutes.

12. The glass or plastic article according to claim 11, wherein said anti-fog coating comprises:
    about 10 to about 80 wt %, based on the total weight of solids in said coating of said hydroxyl group containing polymer, and
    about 20 to about 90 wt %, based on the total weight of solids in said coating of said aluminum coating crosslinker.

13. The glass or plastic article according to claim 12, wherein:
    said aluminum containing crosslinker is selected from the group consisting of aluminum oxide, aluminum hydroxide, boehmite alumina, alumina hydrate, pseudoboehmite, aluminum salts and mixtures thereof.

14. The glass or plastic article according to claim 11, wherein said anti-fog coating comprises:
    about 20 to about 60 wt %, based on the total weight of solids in said coating of said hydroxyl group containing polymer, and
    about 40 to about 80 wt %, based on the total weight of solids in said coating of said aluminum coating crosslinker.

15. The glass or plastic article according to claim 14, wherein:
    said aluminum containing crosslinker is selected from the group consisting of aluminum oxide, aluminum hydroxide, boehmite alumina, alumina hydrate, aluminum salts and mixtures thereof.

16. A method of providing an anti-fog property to a surface of glass or plastic substrate, which comprises the steps of:
    preparing an anti-fog coating composition that contains the following ingredients:
    a hydroxyl group containing polymer selected from the group consisting of poly(vinyl alcohol), poly(vinyl acetate), cellulose ethers and mixtures thereof;
    an aluminum containing crosslinker; and
    a surface active agent selected from the group consisting of nonoxynol, silicone glycol, poly(oxy 1,2-ethanediyl)-alpha(nonphenyl)omega-hydroxy, ethoxylated acetylenic diol, glyceryl monooleate, polyether modified dimethylpoly siloxane and mixtures thereof; and
    applying a coating of said anti-fog coating composition to the surface of said glass or plastic substrate.

17. The method of claim 16, wherein said hydroxyl group containing polymer is present in said coating in an amount of about 10 to about 80 wt %, based on the total weight of solids in said coating.

18. The method of claim 16, wherein said aluminum containing crosslinker is present in said coating in an amount of about 20 to about 90 wt %, based on the total weight of solids in said coating.

* * * * *